April 23, 1968     V. BOBROWSKI     3,379,355
WELDING HEAD CENTERING DEVICE FOR TUBE MAKING MACHINES
Filed March 12, 1965
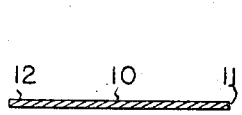
Fig. 1
Fig. 2
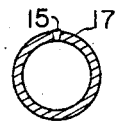
Fig. 3
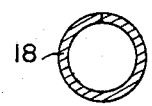
Fig. 4
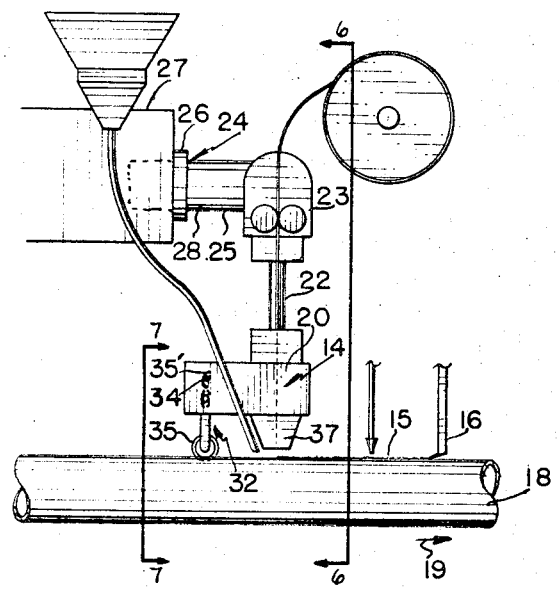
INVENTOR.
Victor Bobrowski

United States Patent Office 3,379,355
Patented Apr. 23, 1968

3,379,355
WELDING HEAD CENTERING DEVICE FOR
TUBE MAKING MACHINES
Victor Bobrowski, 208 Bruce Ave.,
Winnipeg, Manitoba, Canada
Filed Mar. 12, 1965, Ser. No. 439,151
3 Claims. (Cl. 228—25)

ABSTRACT OF THE DISCLOSURE

An angulated shaft rotatably mounted in a fixed support and carrying a head for continuous welding of longitudinal edges of a tube. A tube edge engaging guide member is supported by a bracket on the welding head, being longitudinally aligned with the head in a plane which is offset laterally from the axis of rotation of the angulated shaft so that the weight of the welding head biases the guide member laterally into engagement with one edge of the tube being welded.

My invention relates to new and useful improvements in welding head centering devices, particularly welding heads that are adapted to be used for the longitudinal seam of continuously formed tubing.

One of the methods of forming relatively long lengths of tubing for grain augers and the like, is to feed a flat strip of metal through a plurality of rollers, each set of rollers gradually curving the sheet until the two longitudinal edges meet and a tube has been formed. At this point, the longitudinal edges pass under an automatic welding head which forms a welding seam in a continuous manner.

A disadvantage of such tube making machines is that it is impossible to prevent the longitudinal edges forming the seam from wavering from side to side as it passes under the welding head. This is due to slight imperfections in the material and to the fact that the normal tube making machine cannot provide means for maintaining exact symmetry of the two sides of the tubing as it is formed from the flat sheet. While this is not important in the finished tubing, it will be appreciated that any slight deviation from a straight line passing under the welding head will mean that the weld will not necessarily be equal where it contacts the two longitudinal edges. In fact, if the side to side movement is more than a few thousandths of an inch, it is quite likely that the weld will miss the seam.

It is conventional to provide an operator who manually adjusts the welding head visually as the seam is passing thereunder, and it will be appreciated that this is arduous as well as demanding relatively heavy concentration.

I have provided a sensing device attached to the welding head which engages one longitudinal edge of the seam just prior to its passing under the welding head. By pivoting the welding head, the sensing device automatically adjusts the welding head for slight variations from the center line as the seam passes thereunder thus ensuring that the weld is centered exactly upon the seam.

The principal object and essence of the invention is therefore to provide a device of the character herewithin described which maintains the welding head in the desired relationship with the longitudinal seam passing thereunder.

Another object of the invention is to provide a device of the character herewithin described in which the welding head is offset upon the pivot so that the weight of the welding head maintains the sensing device against one longitudinal edge rather than relying upon a device which is acted upon by both longitudinal edges.

Still another object of the invention is to provide a device of the character herewithin described which is automatic in function thus eliminating the necessity for an operator.

Still another object of the invention is to provide a device of the character herewithin described which is simple in construction, economical in manufacture and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a cross sectional end view of the sheet from which the tubing is formed.

FIGURE 2 is a cross sectional representation of the tubing prior to welding.

FIGURE 3 is a view similar to FIGURE 2, but with the weld in place.

FIGURE 4 is a view similar to FIGURE 3, but with the surplus welding removed.

FIGURE 5 is a side elevation of a welding head and a portion of the tubing, with my device incorporated therein.

FIGURE 6 is a view substantially along the lines 6—6 of FIGURE 5.

FIGURE 7 is a view substantially along the lines 7—7 of FIGURE 5.

FIGURE 8 is a schematic plan view showing the relationship of the sensing device to the seam.

In the drawings like characters of reference indicate corresponding parts in the different figures.

Proceeding therefore to describe my invention in detail, reference should first be made to FIGURES 1 to 4.

Reference character 10 illustrates an end view of a strip of metal which is fed from a roll into the tube making machine. The various rollers and guides in the machine form the strip 10 into a cylindrical configuration illustrated in FIGURE 2, and the longitudinal edges 11 and 12 of the strip 10 become adjacent one another to form a longitudinal seam line 13. This passes under a welding head assembly collectively designated 14 which deposits a weld 15 thus joining the two longitudinal edges together. This weld then passes under a scarfing tool 16 which scrapes off surplus weld above the contour 17 of the tubing thus providing a finished tubing having a cross-sectional configuration similar to that illustrated in FIGURE 4.

The remainder of the figures in the drawings, show my invention in use and the tubing to be welded is identified by the reference character 18. This tubing is moved in the direction of arrow 19 passing under the welding head 14, the weld being shown by the reference character 15 in FIGURE 5.

The welding head collectively designated 14 includes conventional electric welding components carried within a casing 20, power entering via the flexible cables 21.

The casing 20 is supported upon a vertical tube or carrier 22 which in turn is secured to a plate member 23. A trunnion assembly collectively designated 24 comprises a curved shaft 25 secured to the plate 23 and then curving in a direction parallel to the direction of travel 19 of the tubing 18. A bearing 26 is secured within supporting structure 27 and the parallel portion 28 of the shaft is rotatably journally within the bearing, thus mounting the entire welding head 14 for pivotal movement in an arc in a direction normal to the direction of travel 19 of the tubing 18.

Reference to FIGURE 6 will show that the curved shaft 25 places the welding head in a position which is laterally offset from the vertical axis 29 of the bearing 26 and the parallel portion 28 of the shaft so that the weight of the welding head will normally cause same to pivot in the direction of arrow 30 shown in FIGURE 6 although, of course, the welding head may pivot in the direction of double headed arrow 31.

Guide means collectively designated 32 are secured to the casing 14. The guide means 32 comprises a vertical bracket 33 secured in spaced relationship to the casing 20 by means of bolts 34 passing through vertically slotted apertures 35' within the bracket so that the bracket can be adjusted vertically within limits.

An edge sharpened wheel or guide member 35 is journalled for rotation upon the lower end 36 of the bracket 33 and this wheel lies in a plane parallel to the direction of travel 19 of the tube 18.

The bracket and wheel 33 and 35 are secured to the casing 20 in advance of the welding nozzle 37 with the wheel or disc 35 projecting into the gap 38 between the two longitudinal edges 11 and 12 of the seam 13.

The weight of the welding head in conjunction with the offset trunnion mounting thereof causes one side 39 of the wheel or disc 35 to engage one longitudinal edge 11 of the seam and as the disc is rigidly secured to the welding head, any variation or movement of the edge 11 will cause a corresponding variation upon the nozzle 37 thus ensuring that the weld 15 is deposited correctly with relation to the seam of the tube 18.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a machine for continuous seam welding of two adjacent longitudinal edges of a continuously formed tube, the combination of a fixed support having a horizontal bearing, an angulated shaft having a straight portion rotatably journalled in said bearing and a laterally oriented free end portion, a carrier secured to the free end of said shaft and extending downwardly therefrom, a welding head mounted at the lower end of said carrier, bracket means provided on said welding head, and a guide member supported by said bracket means in advance of and in longitudinal alignment with the welding head relative to edges of a tube to be welded, said welding head and guide member being disposed in a plane which is offset laterally from the axis of said bearing by said angulated shaft, whereby gravitational effect of said carrier and welding head may bias said guide member against only one longuitdinal edge of a tube being welded.

2. The device as defined in claim 1 together with means for vertically adjusting said bracket means with said guide member relative to said welding head.

3. The device as defined in claim 1 wherein said guide member comprises a wheel rotatably mounted on said bracket means and having a bevelled edge.

References Cited
UNITED STATES PATENTS

| | | | |
|---|---|---|---|
| 1,200,304 | 10/1916 | Brown | 228—17 |
| 2,432,495 | 12/1947 | Baird | 219—125 |

RICHARD H. EANES, JR., *Primary Examiner.*